United States Patent [19]

Powell

[11] 4,223,767

[45] Sep. 23, 1980

[54] ANTI-JACKKNIFING METHOD AND APPARATUS

[76] Inventor: P. Ray Powell, 4622 Lincoln Blvd.,, Cypress, Calif. 90630

[21] Appl. No.: 5,148

[22] Filed: Jan. 22, 1979

[51] Int. Cl.³ .............................................. B60T 7/08
[52] U.S. Cl. .................................... 188/112 A; 303/7
[58] Field of Search .......... 180/282; 188/3 R, 112 A; 280/432, 446 B; 303/7, 101

[56] References Cited

U.S. PATENT DOCUMENTS

| 3,758,165 | 9/1973 | Savelli | 188/112 A X |
| 3,972,543 | 8/1976 | Presley et al. | 188/112 A X |
| 4,023,863 | 5/1977 | Sisson et al. | 188/112 A X |

Primary Examiner—Duane A. Reger
Attorney, Agent, or Firm—Fulwider, Patton, Rieber, Lee & Utecht

[57] ABSTRACT

An anti-jackknifing method and apparatus for preventing uncontrolled skidding or jackknifing of a trailer towed by a tow vehicle. The method includes the step of continuously disabling one of the rear trailer brakes throughout a period when slippery road conditions are encountered so that the associated wheel is allowed to rotate freely. The apparatus for disabling the particular brake is actuable by the driver whenever slippery road conditions are anticipated, and are deactuated by the driver when such conditions no longer prevail.

10 Claims, 4 Drawing Figures

ANTI-JACKKNIFING METHOD AND APPARATUS

BACKGROUND OF THE INVENTION

1. Field of the Invention

The invention relates to an anti-jackknifing method and apparatus, and particularly to such an apparatus and method for a tow vehicle-trailer arrangement.

2. Description of the Prior Art

A tow vehicle-trailer arrangement in which the trailer is articulated or capable of lateral movement independently of the tow vehicle is subject to sideways skidding of jackknifing of the trailer out of control of the driver. This dangerous condition frequently occurs when the tow vehicle or truck and trailer are heavy-duty vehicles operating in an empty or lightly loaded condition on wet or slippery roads. Braking by the driver must be carefully controlled to prevent the trailer from skidding laterally or jackknifing.

Federal and State authorities have required that heavy-duty truck-trailer combinations be equipped with electronic anti-skid systems or the equivalent to provide automatic maintenance of brake balance. It is believed that the skid control systems developed to satisfy such requirements all operate on the principle that brake unbalance is the primary cause of truck jackknifing accidents.

A typical prior art system becomes operative whenever the angular relationship between the tow vehicle and the trailer undergoes a predetermined change. The system sends separate braking commands to the various brakes to compensate left and right braking forces to thereby maintain stability. U.S. Pat. No. 3,894,773, issued July 15, 1975, and entitled "Differential Braking System for Tractor-Trailer Trucks", discloses one such system.

U.S. Pat. No. 3,993,362, issued Nov. 23, 1976, and entitled "Anti-Jackknifing and Skidding Control System", teaches a system utilizing a linear accelerometer located on the rear of the trailer to detect left or right skidding and to provide automatic differential braking to the left or right wheels, depending upon the direction of skidding.

Such prior art systems are relatively expensive, sophisticated, and usurp braking control of the tow vehicle and trailer from the driver. In addition, certain automatic skid control systems of the prior art have malfunctioned to such an extent that truck operators are hesitant to rely upon them.

In summary, the systems of the prior art do not provide a simple and inexpensive way of enabling a tow vehicle-trailer combination to be effectively braked and at the same time keep the trailer from jackknifing.

SUMMARY OF THE INVENTION

According to the present invention, there is a complete departure from the prior art concept of applying braking action on all of the wheels equally to prevent uncontrolled lateral skidding or jackknifing of the trailer.

The present anti-jackknifing method comprises the step of continuously disabling one of the left and right rear brake means on the trailer and, in some instances, on the tow vehicle, throughout a period of time that slippery road conditions are encountered. As a consequence of such disablement, the rear wheel or wheels associated with the particular brake means are unbraked and rotate freely, tending to maintain the trailer in a straight line of travel.

The apparatus utilized to practice the aforementioned method comprises disabling means coupled to one of the left and right rear brake means of the trailer, such disabling means being actuable to render such brake means inoperative so that braking of the trailer is ineffective to brake the associated rear trailer wheel or wheels. The apparatus includes control means manually operative to actuate the disabling means for an extended period of time, rather than intermittently. Thus, the present method and apparatus establish an unbalanced braking condition, and rely upon what might be termed a "free-rolling" wheel to maintain the trailer in a straight line of travel.

In a heavy-duty truck-trailer application the rear wheels at each side of the trailer comprise dual tires and a brake drum, with the complete assembly weighing in excess of 300 pounds. This mass, rotating and incapable of locking up and skidding, tends to roll in a straight line even though the other wheels may be completely braked, locked up, and skidding.

In a heavy-duty truck-trailer application the present apparatus typically comprises a solenoid actuated valve located in the air conduit which supplies air to the air brakes. The solenoid is selectively energized by closing a switch or the like, which is preferably located where it can easily be reached by the operator for actuation at any time slippery or other unfavorable road conditions are anticipated or encountered. The present anti-jackknifing apparatus and method are adapted not only for installation on new trucks and trailers, but also are adapted for use on the many thousands of older trucks and trailers that are not equipped with any kind of anti-skid system.

Other objects and features of the invention will become apparent from consideration of the following description taken in connection with the accompanying drawings.

DESCRIPTION OF THE PREFERRED EMBODIMENT

Figure 1:
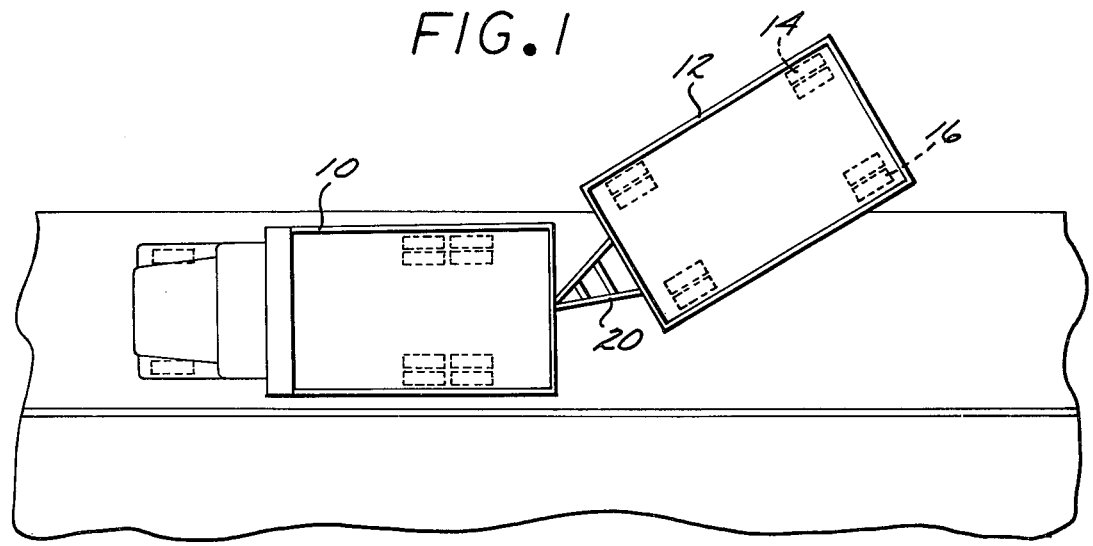
FIG. 1 is a schematic plan view of a tow vehicle-trailer arrangement, the trailer being illustrated in a jackknife condition.
Figure 2:
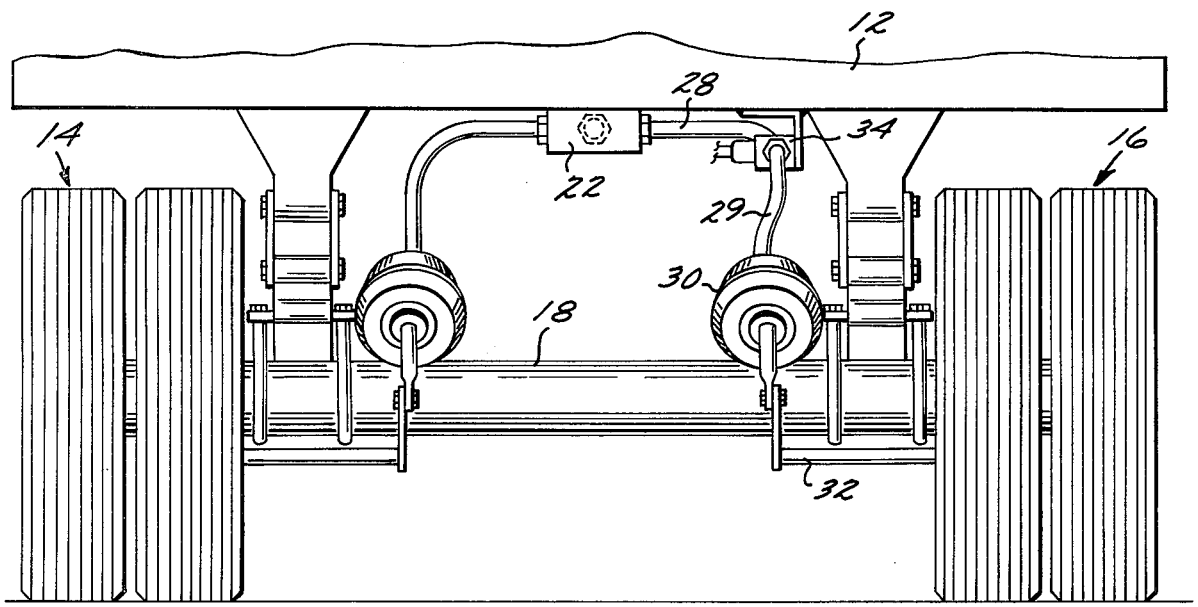
FIG. 2 is a partial rear elevational view of the trailer, particularly illustrating the brake and wheel arrangement.

Referring now to FIG. 1 of the drawings, a heavy-duty tow vehicle or truck 10 is illustrated towing a pull trailer 12. The truck 10 is characterized by a front axle and a pair of rear axles having dual wheels at each end. The trailer 12 is a two-axle vehicle having dual wheels at the ends of both the front axle and the rear axle 18. The truck 10 and trailer 12 constitute separate bodies articulated at a connecting pivot point which is defined by the point of connection of the trailer tongue 20 to the truck 10.

The illustrated truck and trailer combination are merely exemplary of one application for the present method and apparatus. The method and apparatus are also applicable to many other trailer arrangements, including so-called "semis" which include a tractor or cab and a trailer which partially overlies the cab frame. In some instances a second trailer is pivoted to the first trailer, providing two points of articulation, and the present system can be used on both trailers. Where road conditions are particularly severe, the present system can also be used on the trailing axle of the truck 10 if the truck 10 has many axles.

The present method and apparatus will also work with various types of braking systems. Pneumatic or air brakes are described herein by way of example, but the method and apparatus are also applicable to other brakes, such as electric brakes and hydraulic brakes or the like.

When reference is made in the present disclosure and claims to a "rear" wheel, the term is intended to comprehend, in a trailer having multiple trailing or rear axles, the wheel or wheels at one end of at least one of the axles. Further, as will be seen, it is preferred to associate the present apparatus with the right rear wheel or wheels of the trailer, although it is also possible to associate it with the left rear wheel or wheels. The right rear wheel arrangement is preferred because the slope or crown of most roadways, and the consequent construction of the rear axle of most heavy-duty trucks, tends to induce lateral skidding or jackknifing of the trailer to the right, as viewed in FIG. 1.

The typical air brake system of heavy-duty trucks such as the truck 10 includes an air relay valve 22 connected by an air conduit or hose 24 to an air supply or tank 26. The air tank 26 is maintained at a predetermined level of air pressure by a suitable air compressor (not shown).

An air conduit or hose 28 connects the relay valve 22 to a solenoid valve 34, and a similar air conduit or hose 29 connects the valve 34 to the air chamber of a usual and conventional air brake 30. The brake 30 is mechanically connected by a linkage 32 to the brake friction pad assembly (not shown) associated with the dual right rear wheels 16. As will be apparent, driver actuation of the brake system, as by depression of the usual brake pedal, normally routes air under pressure to the brake 30 to actuate the linkage 32 and thereby slow or brake the wheels 16. According to the present invention, the valve 34 is normally open to allow such air to flow to the brake 30. However, when the solenoid 36 of the valve 34 is energized, the valve spool of the valve 34 is moved to a position which cuts off or blocks the flow of air to the air brake 30, and simultaneously vents to atmosphere any air which is under pressure in the brake 30.

The valve 34 may be any of many commercially available valves suitable to accomplish the functions just described. One suitable type of valve is a three-way, normally open valve manufactured by ISI Fluid Power, Inc., Troy, Mich. The valve 34 includes an inlet port (not shown) in fluid communication with the air hose 28, an outlet port (not shown) in fluid communication with the air hose 29 leading to the air brake 30, and a third port (not shown) in fluid communication with atmosphere.

As will be apparent to those skilled in the art, the valve 34 is normally operative to allow air to pass to the air brake 30 whenever the driver or operator actuates the brake system to brake all the wheels of the trailer. However, upon energization of the solenoid 36, the usual spool of the valve 34 is moved to prevent air from passing through the valve 34 to the air brake 30, and to vent to atmosphere any air which may be in the chamber of the air brake 30. This insures that the wheel 16 is free to rotate despite any previous braking action which may have been initiated by the driver.

Figure 3:
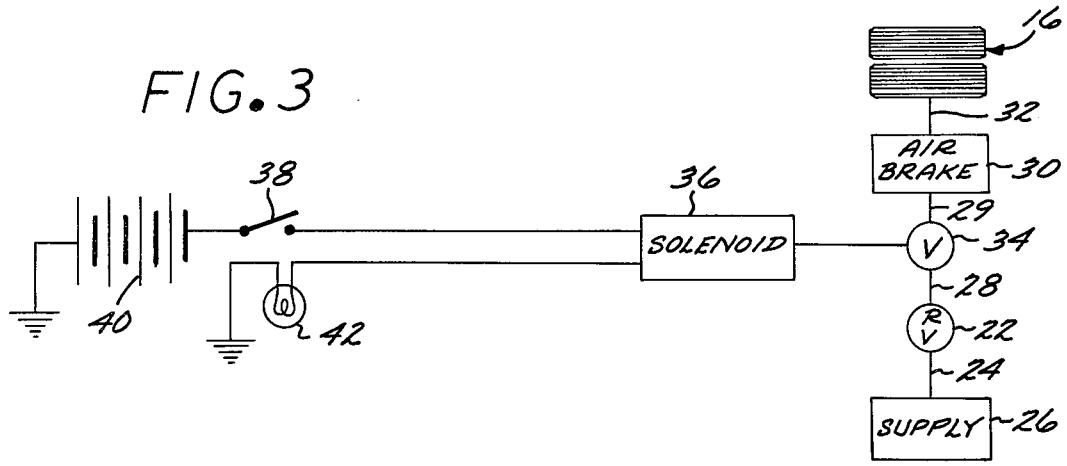
FIG. 3 is a schematic block diagram of the present anti-jackknifing apparatus in operative association with components of the tow vehicle-trailer arrangement of FIG. 1.

The valve 34 and solenoid 36 comprise disabling means for the air brake 30, and such means are actuable by manually operative control means which comprise, as best seen in FIG. 3, a toggle switch 38 in electrical circuit with a truck battery 40 which is connected to ground. In the open position of the switch 38 the solenoid 36 is deenergized and air is able to pass through the valve 34 to the air brake 30. In the closed position of the switch 38 current passes from the battery 40 to energize the solenoid 36, the circuit being completed to ground from the solenoid 36 through a warning or indicating light 42. Such energization of the solenoid 36 actuates the valve 34 to block passage of any air to the air brake 30, and to vent any high-pressure air in the brake 30 to atmosphere.

Preferably the toggle switch 38 and indicator light 42 are located on the truck dashboard (not shown) for convenient operation and viewing by the truck driver.

In a vehicle braking system utilizing electric brakes, the present anti-jackknifing apparatus would be modified to the extent that the toggle switch 38 would be operative to suitably energize and de-energize the solenoid associated with the electric brakes. In similar fashion, the present method and apparatus are adapted for use with hydraulic brakes by employing electrically operated hydraulic valves, as will be apparent to those skilled in the art.

In operation, the truck driver closes the switch 38 whenever he encounters or anticipates encountering rainy or icy conditions productive of slippery roads. This cuts off or blocks air to the air brake 30 for the right wheels 16. The light 42 indicates the disabled condition of the air brake 30. Thereafter, upon depression of the brake pedal (not shown) all of the truck and trailer wheels are braked except the right rear wheels. Even if all other wheels lock up and skid, the right wheels 16 and their associated mass of tires and hub continue to roll and tend to maintain the trailer in a straight line path. In icy conditions the usual chains on the wheels provide additional mass and traction and further tend to maintain the trailer in a straight line path.

Despite the absence of braking of the right wheels 16 in the present system, the total braking force on the trailer and vehicle compares favorably with what the braking force would be if all of the wheels of the trailer were locked up and skidding. The braking force also compares favorably with the braking force developed by prior art electronic automatic skid control systems since such systems generally do not apply a steady braking force, but rather intermittently apply a braking force to the left or to the right wheels, depending upon the direction of lateral movement of the trailer. Such intermittent braking significantly reduces the total braking force.

Figure 4:
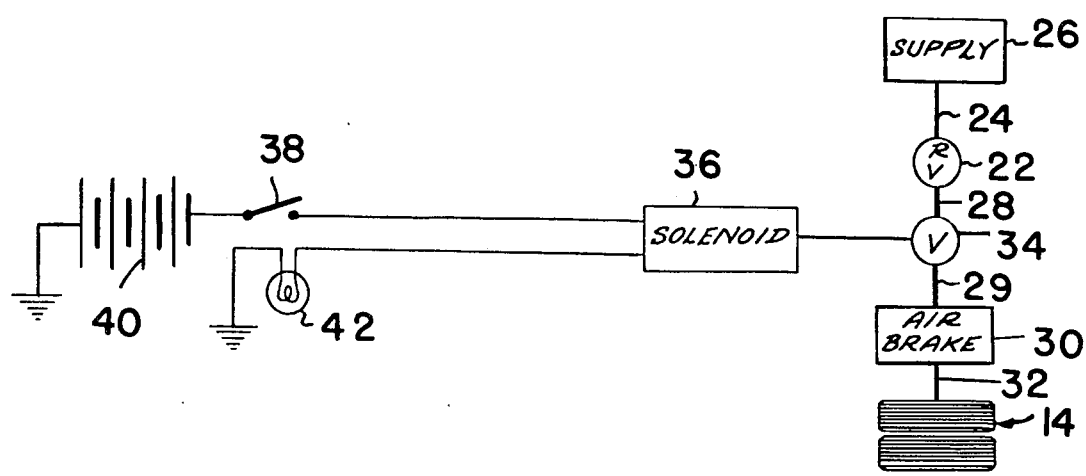
FIG. 4 is a schematic block diagram of the present anti-jackknifing apparatus in operative association with components of the tow vehicle-trailer arrangement as applied to the left wheels of the trailer.

FIG. 4 is a schematic block diagram of an anti-jackknifing apparatus applied to left rear wheels 14 of trailer 12. Identical elements to those shown and described in FIG. 3 are used with the only difference being that such elements are now applied to left rear wheels 14.

In summary, the method and apparatus of the present invention permit effective braking of heavy-duty trucks and trailers without jackknifing, the free-rolling wheel or wheels exerting a stabilizing effect in maintaining the trailer in a straight line path.

Various modifications and changes may be made with regard to the foregoing detailed description without departing from the spirit of the invention.

I claim:

1. Anti-jackknifing apparatus for a trailer towed by a tow vehicle, said trailer including left and right rear wheels and left and right brake means operative to brake said left and right wheels, respectively, said apparatus comprising:

disabling means coupled to one of said left and right brake means and actuable for rendering only one of said left and right brake means inoperative whereby braking of said trailer by the driver of said tow vehicle is ineffective to brake the wheel or wheels associated with said one of said left and right brake means; and, control means manually operative in the tow vehicle to actuate said disabling means for an extended period of time whereby said disabling means is adapted to render said one of said left and right brake means continuously inoperative during travel of said trailer over slippery roads.

2. Anti-jackknifing apparatus according to claim 1 wherein said disabling means is coupled to said right brake means.

3. Anti-jackknifing apparatus according to claim 1 and including second disabling means coupled to one of the left and right brake means of the tow vehicle and actuable to render said one of said left and right brake means of the tow vehicle inoperative whereby braking of the tow vehicle by the driver is ineffective to brake the wheel or wheels associated with said one of said left and right brake means of the tow vehicle; and said control means also being manually operative to actuate said second disabling means.

4. Anti-jackknifing apparatus according to claim 1 wherein each of said left and right brake means includes an air brake and an air conduit coupling said air brake to a source of air under pressure; wherein said disabling means includes an air valve in said air conduit of one of said left and right brake means; and wherein said control means in manually operative to actuate said air valve to block air flow through said air conduit to said air brake of said one of said left and right brake means.

5. Anti-jackknifing apparatus according to claim 4 wherein said control means includes a solenoid associated with said air valve and electrically energizable to actuate said air valve.

6. Anti-jackknifing apparatus according to claim 1 and including indicator means in electrical circuit with said solenoid to indicate when said solenoid is electrically energized.

7. Anti-jackknifing apparatus according to claim 1 wherein said control means includes switch means on the towing vehicle and manually operative by the towing vehicle driver to actuate said disabling means.

8. An anti-jackknifing method for preventing jackknifing of a trailer truck by a tow vehicle, wherein said trailer includes left and right rear wheels and left and right brake means operative to brake said left and right rear wheels, respectively, said method comprising the steps of:

continuously disabling from the tow vehicle only one of said left and right brake means throughout a period of time that slippery road conditions are encountered by said trailer whereby the wheel or wheels associated with said one of said left and right brake means is allowed to rotate freely to tend to maintain said trailer in a straight line of travel.

9. An anti-jackknifing method according to claim 8 and including the further step of terminating said disabling when good road conditions are encountered by said trailer.

10. Anti-jackknifing apparatus for a trailer towed by a tow vehicle, said trailer including left and right rear wheels, and further including left and right air brakes connected by conduit means to a source of air under pressure and operative to brake said left and right rear wheels, respectively, said apparatus comprising:

a solenoid valve in that portion of said conduit means leading to said right air brake, and electrically energizable to block air flow only to said right air brake whereby braking of said trailer by the driver of said tow vehicle is ineffective to brake the wheel or wheels associated with said right air brake; and control means for electrically energizing said solenoid valve, and including switch means manually operative by the towing vehicle driver to effect energization of said solenoid valve for an extended period of time whereby said right air brake can be rendered continuously inoperative during travel of said trailer over slippery roads.

* * * * *